United States Patent [19]

West, Jr. et al.

[11] 4,181,962

[45] Jan. 1, 1980

[54] DIGITAL PROGRAMMABLE TIMING DEVICE

[75] Inventors: James C. West, Jr., Colorado Springs, Colo.; Raymond P. Shreeve, Monterey, Calif.

[73] Assignee: The United States of America as represented by the Secretary of the Navy, Washington, D.C.

[21] Appl. No.: 881,960

[22] Filed: Feb. 27, 1978

[51] Int. Cl.² ............................................. G01P 3/00
[52] U.S. Cl. ............................. 364/565; 235/92 MP
[58] Field of Search ............... 364/565; 235/92 MP, 235/92 MT, 92 V, 92 FQ; 340/347 AD; 318/601, 603; 73/510; 324/160, 161, 166

[56] References Cited

U.S. PATENT DOCUMENTS

| 3,767,902 | 10/1973 | Estes et al. | 235/92 MP |
|---|---|---|---|
| 3,899,664 | 8/1975 | Bencini et al. | 235/92 MP |
| 4,016,406 | 4/1977 | Abe et al. | 235/92 MP |
| 4,047,085 | 9/1977 | Ollendick | 318/601 |
| 4,056,778 | 11/1977 | Randazzo | 324/166 |

OTHER PUBLICATIONS

IBM Technical Disclosure Bulletin–Computer and Apparatus for Measuring Rotational Speed by S. Bederman, vol. 13, No. 4, 9-1970, pp. 1017-1018.

Primary Examiner—Malcolm A. Morrison
Assistant Examiner—Gary Chin
Attorney, Agent, or Firm—R. S. Sciascia; Charles D. B. Curry; Francis I. Gray

[57] ABSTRACT

A digital programmable timing device to control the acquisition of data by a computer from high response probes in periodic flows. Synchronized sampling of probe measurements uses a phase-locked-loop and counting circuits so that the moment of A/D conversion always corresponds to a programmable displacement of a stationary probe with respect to moving rotor blades independent of RPM. The rotor speed also is measured digitally in one revolution of the rotor shaft.

9 Claims, 6 Drawing Figures

FIG_1

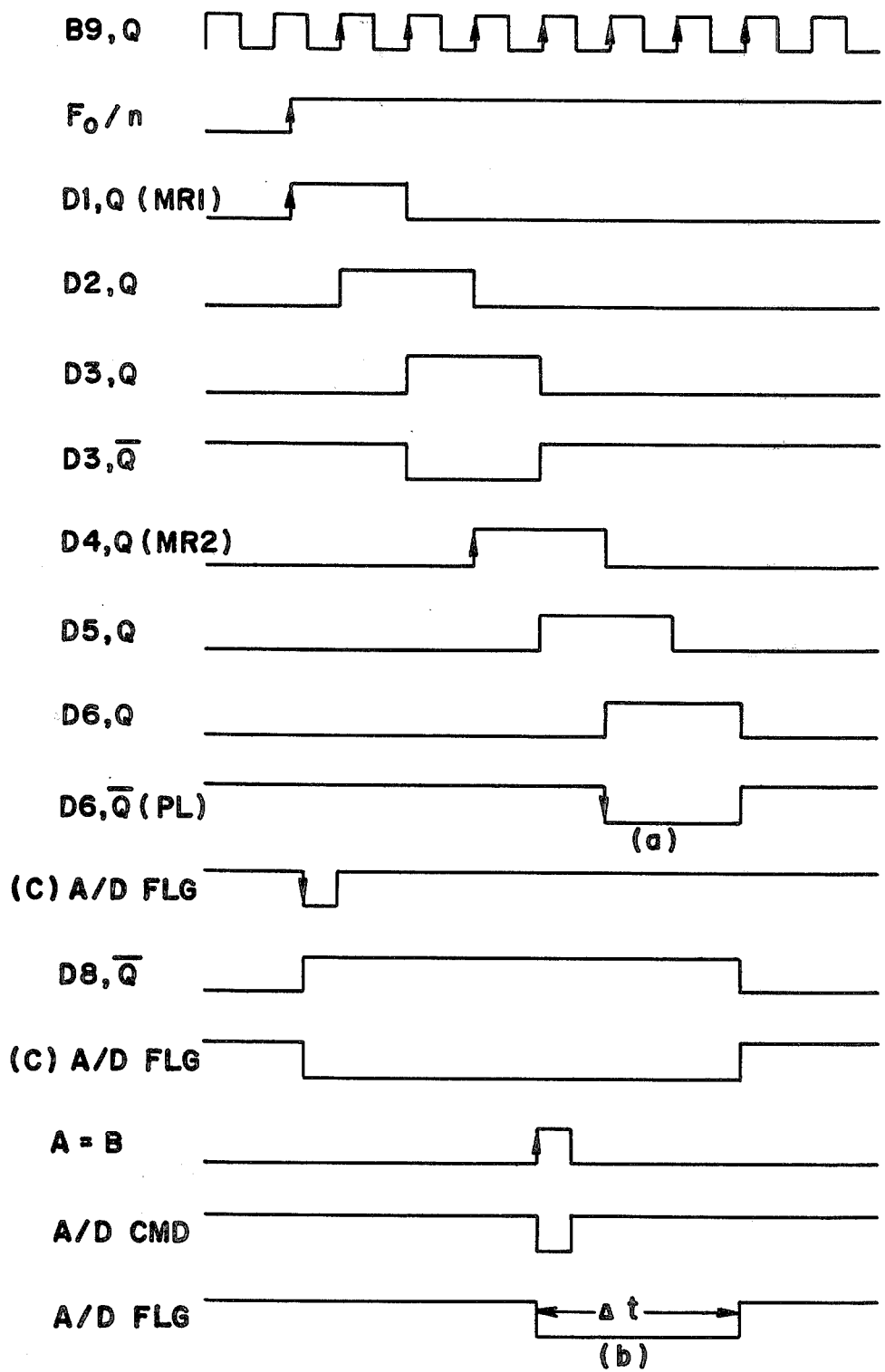
FIG_6

4,181,962

DIGITAL PROGRAMMABLE TIMING DEVICE

BACKGROUND OF THE INVENTION

1. Field of the Invention

The present invention relates to synchronized data sampling of rotating machinery, and more particularly to a digital programmable timing device to progressively delay the sample point across a particular rotor blade to determine aerodynamic characteristics.

2. Description of the Prior Art

The development of a jet engine may take up to ten years, with a significant portion of that time involving development of a compressor. The core compressors, which are axial compressors, have been generally subsonic since the 1940's, that is, the maximum incident velocity at the rotors is less than Mach 0.8, the critical velocity at which turbulence develops. For a compression ratio of 6:1 up to 19 stages are required. In the early 1950's transonic compressors were introduced in the fan stages of bypass jet engines for greater propulsive efficiency, with the core compressors still being subsonic. A transonic compressor has airflow which varies from about 0.8 Mach to 1.6 Mach from the root to the tip of the compressor blade. Performance of these early transonic compressors was poor.

Currently transonic core compressors are under development and have achieved a 6:1 compression ratio in 5 stages. Design of transonic compressors is empirically based on two-dimensional static models which do not take into account the rotational effects of dynamic operation. The rotor blades are cascaded around the hub of the rotor, i.e., each blade is configured and oriented the same. With current point design test bed tests meet required specifications, but off-design operation, such as is encountered in high performance engines for military aircraft, is unpredictable, an undesirable trait. A particular problem of concern is blade flutter which cannot be predicted because current diagnostic methods do not measure individual blade aerodynamic characteristics. Local blade perturbations may be amplified due to adjacent blade interaction creating an additive interference effect which results in blade failure.

Current diagnostic methods to determine rotor characteristics allow only the determination of time averages which tells the designer that something is not right, but not why. Therefore, it is desired to be able to determine individual blade aerodynamic characteristics using stationary sensors and test equipment. To achieve this result the present invention provides sampling of the data synchronized to the revolution of the rotor at any point in the revolution. With this type of data the capability for designing third generation compressors using optimum transonic design with optimum blade aerodynamic characteristics is attained. The result will be greater compressor efficiency, fewer stages for a given compression ratio and shorter development time with concomitant weight and cost savings.

SUMMARY OF THE INVENTION

Accordingly, the present invention provides a digital programmable timing device (PACER) which intercepts data commands from a computer to an analog/digital converter and synchronizes the data requested with the rotation of the rotating device to enable the determination of individual aerodynamic rotor blade characteristics at any point around the rotor. A phase-locked-loop circuit tracks the frequency of the blades past a fixed sensor and outputs a pulse whose frequency is a multiple of the input frequency. The input frequency is a function of the number of blades and the speed of the rotor. The data command from the computer is delayed, until the specified point in the rotor revolution where the data sample is desired occurs, by comparing a computer word with a count of the phase-locked-loop output frequency. At the specified point the data command is forwarded to the A/D converter to provide a data sample to the computer. Additionally, rotor speed is determined by counting clock pulses from the computer from a reference point provided by a second fixed sensor each revolution, the computer then dividing the clock frequency by the count to determine speed.

Therefore, it is an object of the present invention to provide a digital programmable timing device to determine the individual aerodynamic characteristics of each portion of a rotating device.

Another object of the present invention is to provide a digital programmable timing device to synchronize data collection with the rotation of the rotating device.

Still another object of the present invention is to provide a digital programmable timing device to determine rotor speed for each revolution of the rotating device.

Other objects, advantages and novel features of the present invention will be apparent from the following detailed description when read in view of the appended claims and attached drawing.

BRIEF DESCRIPTION OF THE DRAWING

FIG. 6(a) is a timing diagram for the speed determining portion of the digital programmable timing device.

FIG. 6(b) is a timing diagram for the computer command delay portion of the digital programmable timing device.

DESCRIPTION OF THE PREFERRED EMBODIMENT

Figure 1:
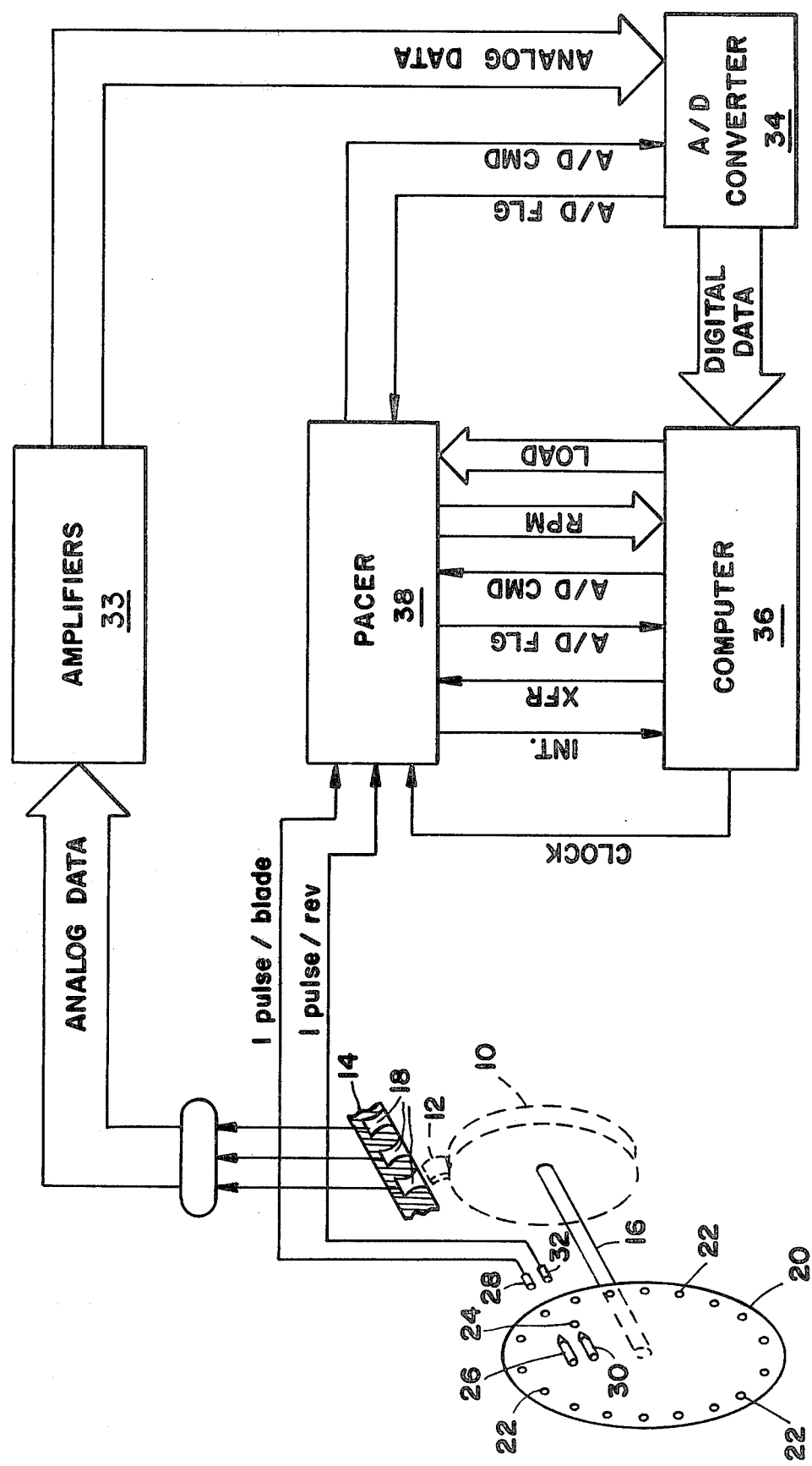
FIG. 1 is a diagrammatic presentation of a system using a digital programmable timing device according to the present invention.

Referring now to FIG. 1 a rotor 10 having a plurality of blades 12 is mounted within a housing 14 on a shaft 16. A plurality of sensors 18 are mounted within the housing 14 flush with the inner wall to measure the dynamic characteristics of the rotor 10, in particular the aerodynamic characteristics of the blades 12. A wheel 20, fixedly attached to the shaft 16, has a plurality of equally spaced small holes 22 near the periphery, the number of holes being equal to the number of blades 12. A single small hole 24 is situated in the wheel 20 interior of the plurality of holes 22 to serve as a marker for each revolution of the rotor 10. A stationary optical emitter 26 with a corresponding photodetector 28 is situated so that the emission from the emitter 26 passes through each of the plurality of holes 22 as the wheel 20 rotates and is detected by the photodetector 28. A second stationary optical emitter 30 with corresponding photodetector 32 is situated so that the emission from the emitter 30 passes through the single hole 24 as the wheel 20 rotates and is detected by the photodetector 32. Thus, the sensors 18 provide analog data of the dynamic environment in the region of the blades 12 of the rotor 10, while the optical pulses from the photodetectors 28, 32 provide digital pulses which are used to synchronize the analog data from the sensors with the blades, as will be described infra.

Amplifiers 33 amplify the analog data from the sensors 18. An analog-to-digital (A/D) converter 34 converts the analog data into digital data. A computer 36 processes the digital data from the A/D converter 34 on an interrupt basis. A digital programmable timing device (PACER) 38 intercepts an encode command from the computer 36 to the A/D converter 34 and causes a delay by counting a predetermined number of pulses whose frequency is set by the speed of the rotor 10. The number of pulses of delay (LOAD) is entered to PACER 38 from the computer 36 via computer software. PACER 38 then generates a new encode command to the A/D converter 34 at the programmed time. The speed of the rotor 10 is determined by PACER 38 in one revolution by counting the number of pulses (RPM) generated by the CLOCK of the computer 36 between pulses from the single hole photodetector 32.

Figure 2:
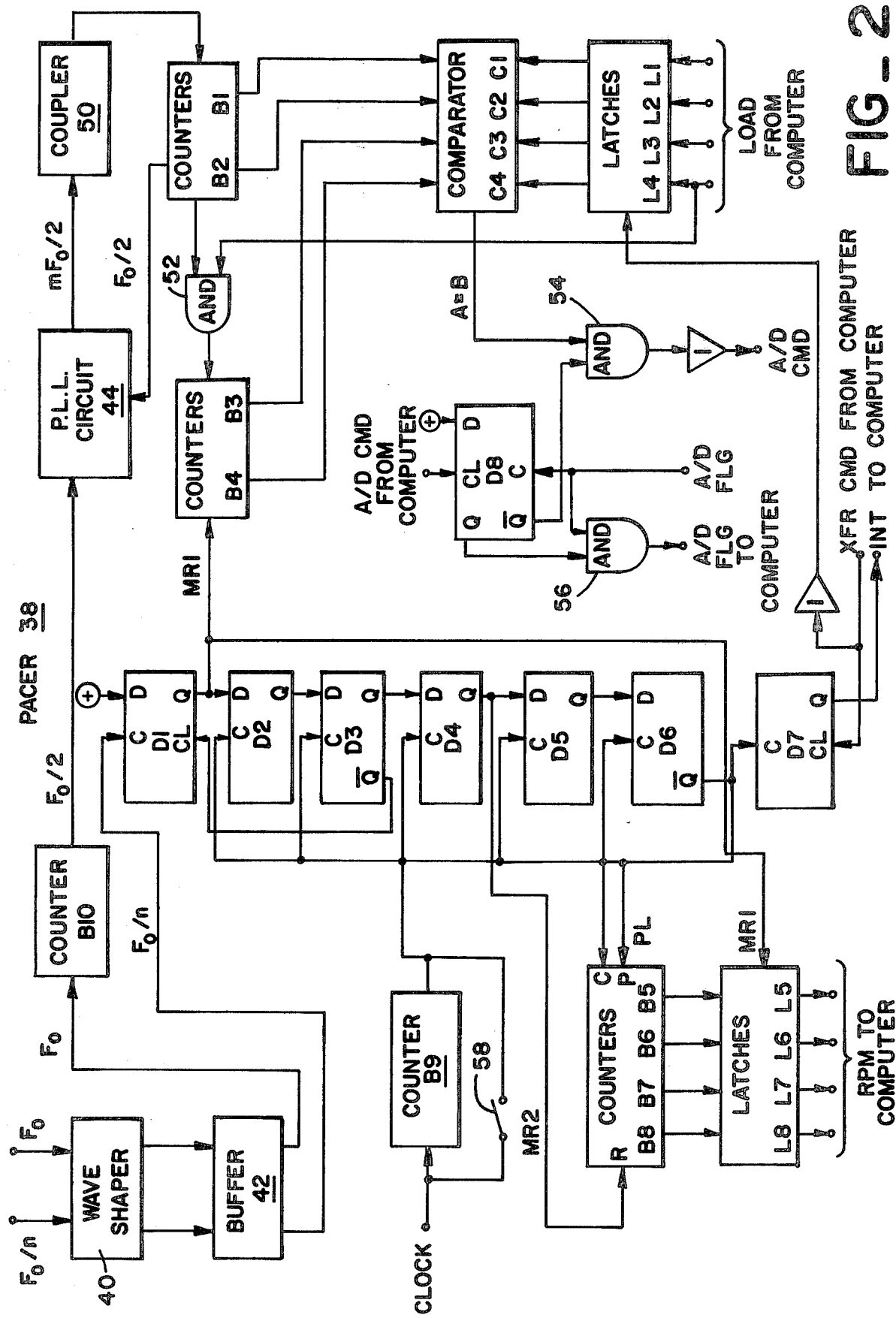
FIG. 2 is a block diagram of one embodiment of a digital programmable timing device.
Figure 3:
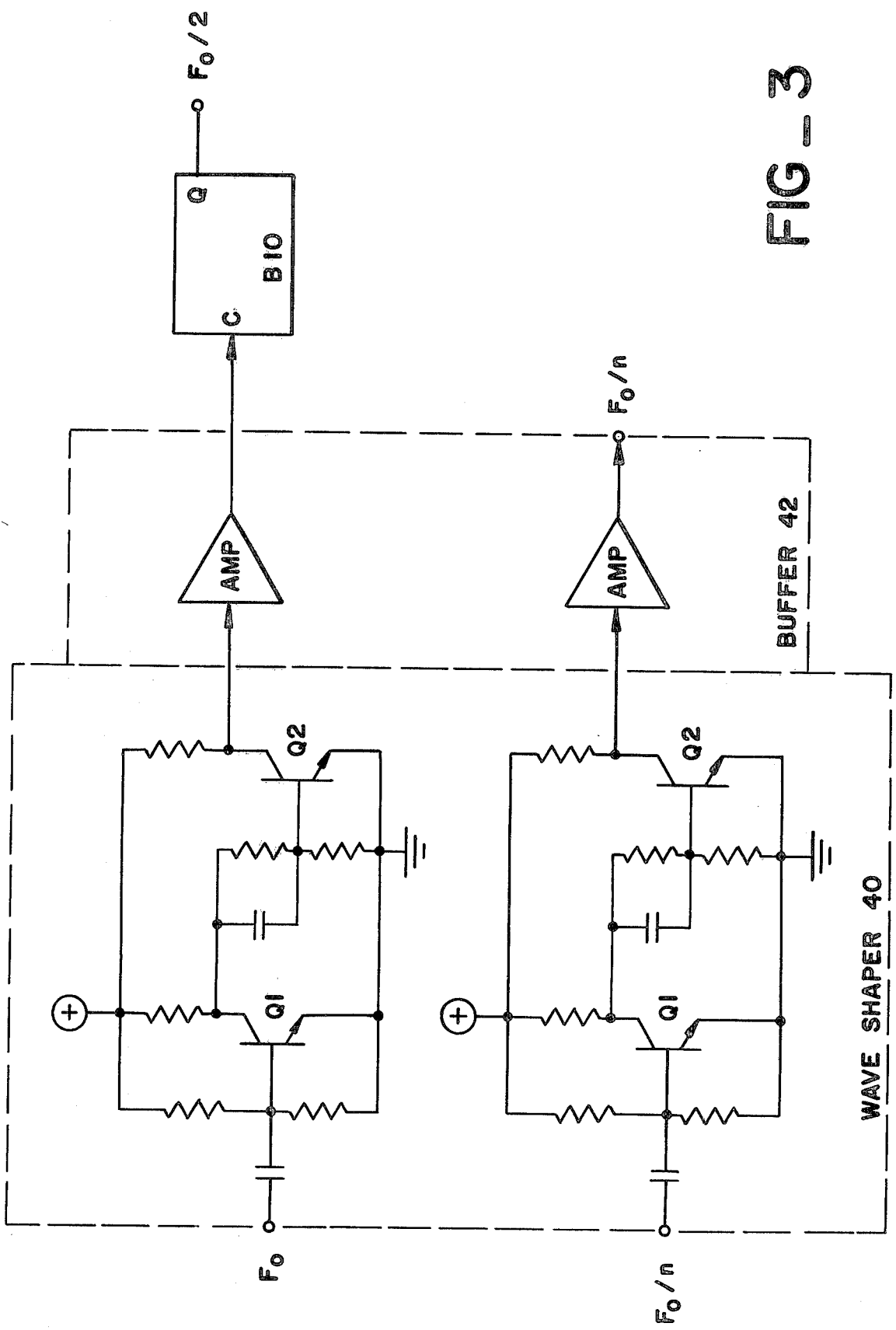
FIG. 3 is a schematic diagram of the input portion of the digital programmable timing device.

The heart of the synchronized sampling system is the PACER 38, shown in FIG. 2. The blade signal, $F_o$, from the blade photodetector 28 and the revolution signal, $F_o/n$ where n is the number of blades, from the revolution photodetector 32 are input to a wave shaper 40. The wave shaper 40 converts the bell-shaped signals from the photodetectors 28, 32 into digital pulse signals with sharp edges suitable for TTL circuits. Transistors Q1 (FIG. 3) gate on into saturation when the output of the respective photodetectors 28, 32 exceeds a threshold. The low voltage output from transistors Q1 cut off transistors Q2, causing the output to go high. When the bell-shaped curve drops below threshold, the reverse process occurs—transistors Q1 are cut-off putting a high voltage input to transistors Q2 which go into saturation. The result is a digital pulse with sharp edges. $F_o$ and $F_o/n$ are connected to a buffer 42 which isolates the photodetectors 28, 32 from the rest of the PACER circuitry. $F_o$ is input to a counter B10 from the buffer 42 which converts $F_o$ into a square wave with one period for every two blades, $F_o/2$.

Figure 4:
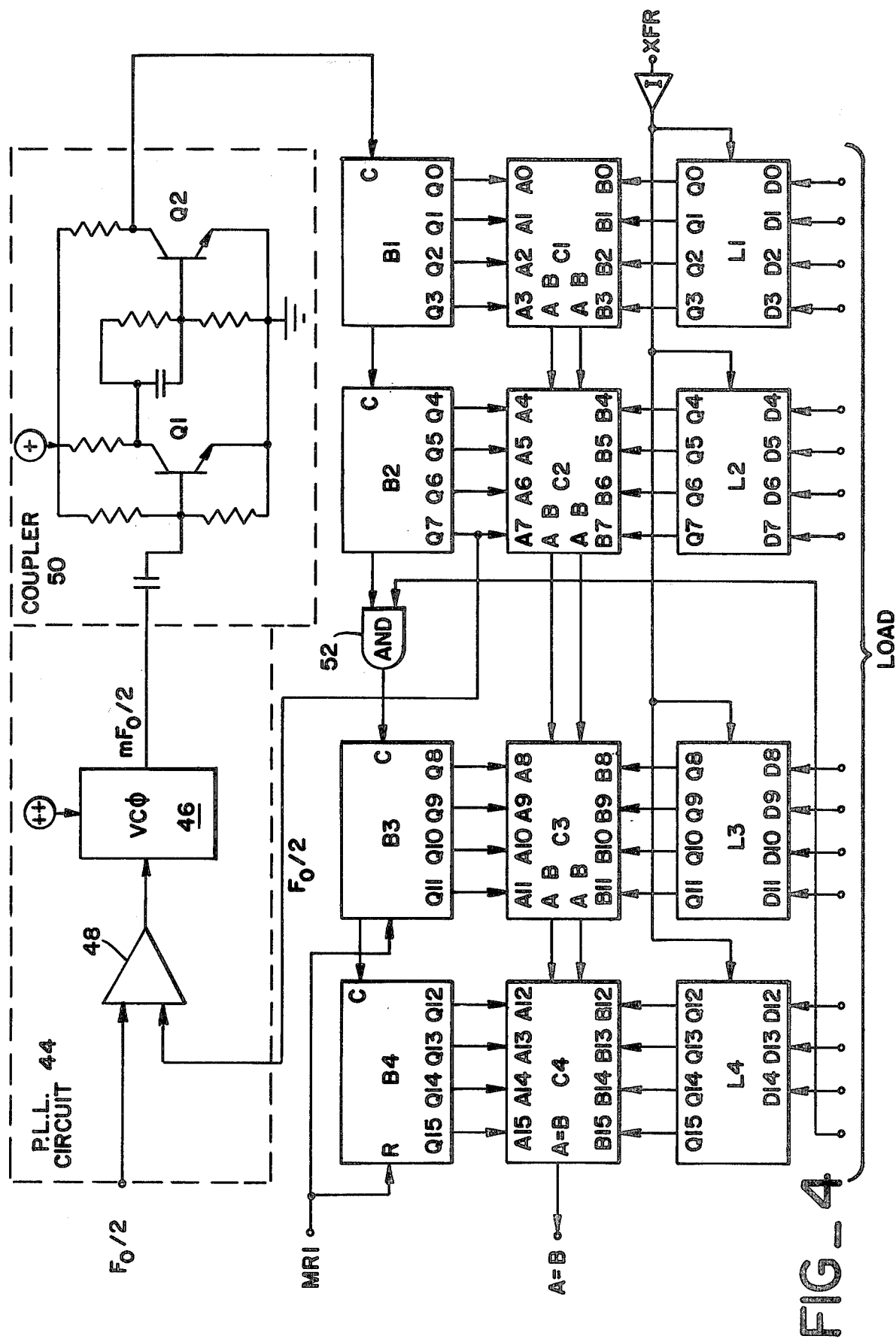
FIG. 4 is a schematic diagram of the phase-locked-loop portion of the digital programmable timing device.

A phase-locked-loop (PLL) circuit 44 produces an output of $mF_o/2$, with m being the number of pulses generated between each blade 12 regardless of the speed of the rotor 10. For m=256 a sampling rate of 128 per blade is achieved. The PLL circuit 44 has a voltage controlled oscillator (VCO) 46 (FIG. 4) with an output at a multiple m of the input frequency $F_o/2$. A comparator 48 compares the $F_o/2$ signal from the counter B10 with an $F_o/2$ signal of similar shape from the VCO 46 via counters B1,B2 to produce an error signal to maintain the output of the VCO at $mF_o/2$. A coupler 50, which operates in the same manner as the wave shaper 40, converts the output of the VCO 46 into a TTL compatible signal of appropriate voltage range.

A plurality of binary counters B1,B2 divide the incoming VCO frequency via the coupler 50 by m (m=256 in the example of FIG. 4) and feed back a signal from B2,Q7 whose frequency is $F_o/2$. The counters B1-B4 are connected for cascade operation. The carry line from B2 is connected to B3 via an AND gate 52. The other input to the AND gate 52 is bit 15 of LOAD from the computer 36. With bit 15 high normal cascade operation of the counters B1-B4 results, but with bit 15 low the carry to B3 is blocked and the counters B3,B4 do not count. Counters B3,B4 are associated with counting the number of blades 12 that have passed the blade photodetector 28.

The computer 36 is connected to a plurality of latches L1-L4. When directed by a software command XFR, the binary number representing LOAD is strobed through the latches to a digital comparator C1-C4. Thus, when the counters B1-B4 have counted the programmed number of pulses according to LOAD, a pulse is generated. The location of this pulse is determined by the mode of operation of the counters B1-B4, i.e., if bit 15 is high the pulse occurs once per revolution of the wheel 20, and if bit 15 is low the pulse occurs m/2 times per revolution of the wheel. The pulse is input to an AND gate 54, the output of which is connected to the A/D converter 34.

When the computer 36 commands (A/D CMD) that a data sample be taken, the command is intercepted by a flip-flop D8 in the PACER 38. The A/D CMD pulse from the computer 36 clears D8, setting $\overline{Q}$ high and enabling the AND gate 54. When the pulse A=B from the comparators C1-C4 occurs, and A/D CMD is sent to the A/D converter 34 from the PACER 38 in sync with the LOAD specified point in the rotation of the wheel 20 for data acquisition by the computer 36. D8,Q goes low when $\overline{Q}$ goes high and inhibits an AND gate 56 to which is also input a data ready flag (A/D FLG) from the A/D converter 34, the A/D FLG being high unless the A/D converter is working. Thus, the computer 36 sees an A/D FLG signal low from the PACER 38 which indicates that the A/D converter 34 is busy taking a data sample where in reality the A/D converter 34 is still waiting for the A/D CMD from the AND gate 54 and its A/D FLG is still high.

Upon receipt by the A/D converter 34 of the A/D CMD the A/D FLG from the A/D converter goes low. A period Δt later (10 microseconds for the particular A/D converter 34 used in this embodiment) the A/D converter has completed conversion of the analog signal and is ready to transfer data to the computer 36. At this time A/D FLG goes high, causing flip-flop D8 to change states and Q goes high and the output of AND gate 56 goes high generating the A/D FLG high signal, which acts an an interrupt to the computer 36. The value of LOAD determined at which point in the revolution of the wheel 20 the sample is to be taken. FIG. 6(b) is a timing diagram for this data command delay operation.

Figure 5:
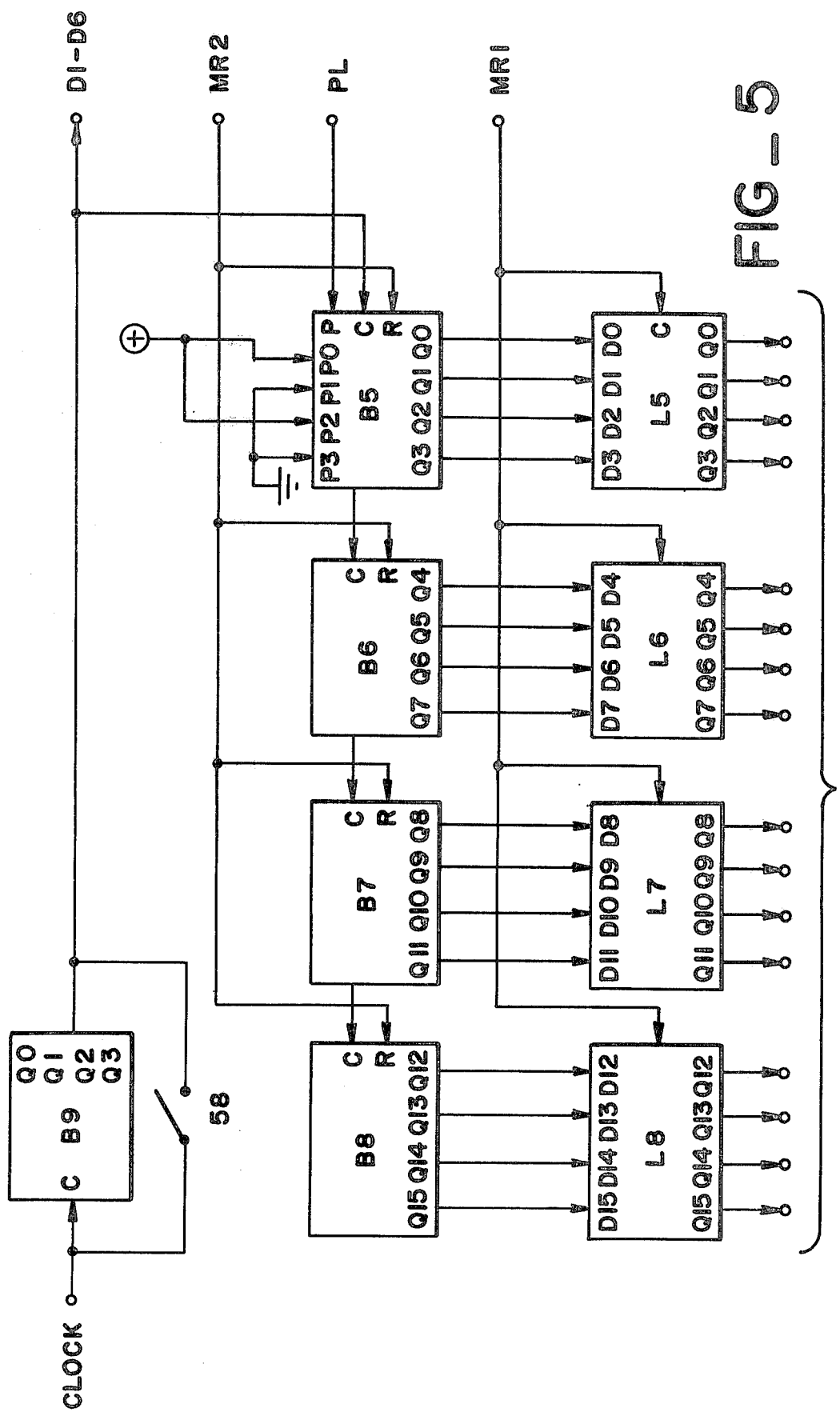
FIG. 5 is a schematic diagram of the speed determining portion of the digital programmable timing device.

CLOCK from the computer 36 is divided by binary counter B9, and by selecting the appropriate output Q0-Q3 CLOCK is divided by ½, ¼, ⅛, or 1/16. This allows flexibility in selecting the optimum frequency for the particular speed of the rotor 10 such that all 16 bits (for this example, see FIG. 5) of binary counters B5-B8 are used without causing overflow. The higher the rotor speed, the higher the clock frequencies needed for the counters B5-B8. The optimum clock frequency input to counters B5-B8 for a given rotor speed is calculated according to $$f_c = S_r \cdot (2^{16} - 1) \tag{1}$$

where $f_c$ is the optimum frequency for the counters B5-B8, $S_r$ is the rotor speed in rps, and $(2^{16}-1)$ is the maximum value of the 16-bit computer word. For high speed rotors 10 the CLOCK via switch 58 would be connected directly to counter B5. Counters B5–B8 are cascaded in the same manner as described for counters B1–B4.

The waveforms for flip-flops D1–D6 are shown in FIG. 6(a). The $F_o/n$ pulse can occur at any point in the CLOCK cycle. The flip-flops D1–D6 change state when their clock input goes high. Thus, D1 changes state according to its D input when $F_o/n$ arrives. All the data inputs D of D2–D6 are connected to the Q outputs of the previous stage. When D1,Q is low before $F_o/n$, all the Q outputs D2–D6 are low. Six flip-flops D1–D6 are used to insure that the clock pulse MR1 to latches L5–L8 does not overlap the reset pulse MR2 of the counters B5–B8, and from the timing diagram one clock pulse separates MR1 and MR2. D1,Q provides MR1 pulse and D4,Q provides the MR2 pulse. D6,$\overline{Q}$ provides a preset signal PL to the counters B5–B8 and sets a flip-flop D7 to generate an INT signal to the computer 36 to indicate RPM is available for transfer.

The XFR command from the computer 36 which transfers LOAD to the comparators C1–C4 also clears flip-flop D7, setting Q low. When the next $F_o/n$ signal occurs, D1,Q goes high to transfer dara out of latches L5–L8, the output following the input from counters B5–B8 while MR1 is present. MR1 also resets counters B3,B4 which count the number of blades per revolution. Counters B5–B8 are not allowed to reset while data is being transferred to the latch outputs. After MR1 and the data transfer resulting therefrom, the counters B5–B8 are cleared by MR2 and then preset by PL to the pulse count on the p inputs to compensate for the number of clock pulses missed between the start of $F_o/n$ and the end of MR2.

Thus, the present invention provides a digital programmable timing device which provides the ability of sampling at any point specified by LOAD from the computer to determine individual blade characteristics in a dynamic environment, and which provides a speed measurement of the rotor each revolution by counting the number of CLOCK pulses each revolution.

What is claimed is:

1. A system for synchronizing analog data from a rotating device having a plurality of blades with the rotation of said rotating device which comprises:
   (a) means for generating a frequency signal proportional to the speed of rotation of said rotating device and the number of said blades;
   (b) means synchronized with said frequency signal for sampling said analog data at a programmable point with respect to said rotating device each revolution; and
   (c) means for determining said speed of rotation for each revolution from a reference point derived from said rotating device.

2. A synchronizing system as recited in claim 1 wherein said sampling means comprises:
   (a) a digital processing device;
   (b) means for converting said analog data to digital data for input to said digital processing device; and
   (c) means synchronized with said frequency signal for generating a data sampling command to said converting means for said programmable point on said rotating device for each revolution when enabled by command from said digital processing device.

3. A synchronizing system as recited in claim 2 wherein said data sampling command generating means comprises:
   (a) a phase-locked-loop circuit to which is input said frequency signal and from which is output a second frequency which is a constant multiple of said frequency signal;
   (b) means for counting the cycles of said second frequency signal, said counting means including a feedback signal to said phase-locked-loop circuit so said second frequency signal tracks variations in said frequency signal;
   (c) means for comparing the count from said counting means with a data word from said digital processing device, said data word specifying said predetermined point; and
   (d) means when enabled by command from said digital processing device for commanding said converting means to transfer said digital data to said digital processing device for said predetermined point upon said comparing means sensing equality.

4. A synchronizing system as recited in claim 3 wherein said determining means comprises:
   (a) means for counting the cycles of a fixed frequency clock from said reference point for each revolution of said rotating device; and
   (b) means including said digital processing device for computing the speed of said rotating device from the count of said counting means for each revolution and the frequency of said fixed frequency clock.

5. A synchronizing system as recited in claim 4 wherein said frequency signal generating means comprises:
   (a) a wheel having a plurality of equally spaced peripheral holes fixedly attached to rotate with said rotating device; and
   (b) means for detecting the passage of said peripheral holes past a fixed reference point to generate said frequency signal.

6. A digital programmable timing device for the synchronized sampling of data from a rotating device, said rotating device providing an input frequency signal and a reference point for each rotation, comprising:
   (a) means for generating a frequency signal which is a constant multiple of said input frequency signal;
   (b) means for generating a data sampling command for a given cycle of said frequency signal between consecutive occurrences of said reference point, said given cycle being programmable; and
   (c) means for generating rotation speed data for each revolution of said rotating device by using said reference point.

7. A digital programmable timing device as recited in claim 6 wherein said frequency signal generating means comprises a phase-locked-loop circuit to which is input said input frequency signal and a feedback signal from said data sampling command generating means so that said frequency signal tracks variations in said input frequency signal.

8. A digital programmble timing device as recited in claim 7 wherein said data sampling generating means comprises:
   (a) means for counting cycles of said frequency signal;
   (b) means for comparing the count from said counting means with a programmed data word, said data word specifying said given cycle; and
   (c) means for outputting said data sampling command when enabled by an external command when said comparing means senses equality.

9. A digital programmable timing device as recited in claim 8 wherein said speed data generating means comprises means for counting the number of cycles of a fixed frequency clock for each revolution of said rotating device.

* * * * *